United States Patent [19]

Beard

[11] Patent Number: 5,703,772
[45] Date of Patent: Dec. 30, 1997

[54] METHOD AND APPARATUS FOR CORRECTING DRIFT IN THE RESPONSE OF ANALOG RECEIVER COMPONENTS IN INDUCTION WELL LOGGING INSTRUMENTS

[75] Inventor: David R. Beard, Houston, Tex.

[73] Assignee: Western Atlas International, Inc., Houston, Tex.

[21] Appl. No.: 529,281

[22] Filed: Sep. 15, 1995

[51] Int. Cl.[6] ................................................. G06F 19/00
[52] U.S. Cl. .............................................................. 364/422
[58] Field of Search ............................ 364/422; 395/929, 395/928; 324/333, 338, 339, 340–343, 346

[56] References Cited

U.S. PATENT DOCUMENTS

| | | | |
|---|---|---|---|
| 4,439,831 | 3/1984 | Sinclair | 364/422 |
| 4,451,789 | 5/1984 | Meador | 324/338 |
| 4,551,681 | 11/1985 | Seeley | 324/333 |
| 4,968,940 | 11/1990 | Clark et al. | 324/338 |
| 5,428,293 | 6/1995 | Sinclair et al. | 324/339 |
| 5,600,246 | 2/1997 | Forgang et al. | 324/339 |
| 5,608,320 | 3/1997 | Dinsmore et al. | 324/253 |

*Primary Examiner*—Donald E. McElheny, Jr.
*Attorney, Agent, or Firm*—Richard A. Fagin

[57] ABSTRACT

A method of determining amplitude and phase response of a receiver amplifier in an induction well logging instrument including the steps of generating an oscillating current at least one frequency, energizing a transmitter coil instrument with the oscillating current, generating a first test signal having a known phase and amplitude relationship with respect to the oscillating current and a different frequency than any frequency in the oscillating current, amplifying and detecting voltages induced in a receiver coil corresponding to electrical properties of an earth formation, conducting a portion of the first test signal to the receiver amplifier causing the amplifier to generate a combined output including the first test signal and a signal resulting from the induced voltages, combining the oscillating current with the first test signal to form a combined test/reference signal, spectrally analyzing the combined test/reference signal and spectrally analyzing the combined output, and comparing spectral analysis of the combined test/reference to spectral analysis of the combined output to determine the phase and amplitude response of the receiver amplifier at the frequency of the test signal. In a preferred embodiment, the method includes linear scaling of the response of the amplifier at the test signal frequency to derive the amplifier response at other frequencies in the voltages induced in the receiver coil corresponding to the electrical properties of the earth formation.

9 Claims, 2 Drawing Sheets

METHOD AND APPARATUS FOR CORRECTING DRIFT IN THE RESPONSE OF ANALOG RECEIVER COMPONENTS IN INDUCTION WELL LOGGING INSTRUMENTS

BACKGROUND OF THE INVENTION

1. Field of the Invention

The present invention is related to the field of electromagnetic induction well logging instruments. More specifically, the present invention is related to systems for correcting drift in the response of analog signal processing components in induction logging instruments.

2. Description Of the Related Art

Electromagnetic induction well logging instruments are used to determine electrical conductivity of earth formations. Electrical conductivity is measured, for among other reasons, inferring fluid content of the earth formations.

An electromagnetic induction logging instrument is typically lowered into the wellbore at one end of an armored electrical cable. The instrument includes a sonde having a plurality of wire coils disposed thereon at axially spaced apart locations. An oscillator typically energizes some of the coils (known as transmitter coils) with oscillating current having predetermined frequency and waveform. The oscillating current passing through the transmitter coils induces oscillating electromagnetic fields in the earth formations surrounding the instrument. Voltages are induced in other coils (known as receiver coils) disposed on the sonde in response to the electromagnetic fields. Receiver circuits in the instrument, connected to the receiver coils, measure electrical properties of the voltages induced in the receiver coils such as the amplitude of the voltage and the phase of the voltage with respect to the phase of the oscillating current energizing the transmitter coils. The electrical properties of the induced voltages are related to the electrical conductivity of the formation. The receiver circuits are typically connected to other circuits in the instrument which generate signals corresponding to the properties of the voltages induced in the receiver coils. The signals can be stored in electronic storage devices in the instrument or can be transmitted over the armored electrical cable to equipment located at the earth's surface for observation and recording.

The receiver circuits typically include analog amplifiers coupled to the receiver coils, because the magnitude of the voltages induced in the receiver coils can be extremely small, sometimes on the order of $10^{-8}$ volts. The analog amplifiers increase the magnitude of the voltages induced in the receiver coils to levels compatible with the circuits which determine the properties of the induced voltages and generate the corresponding signals. Analog amplifiers, however, are subject to variation in phase and amplitude response. Analog amplifiers typically include a filter circuit to reduce the magnitude of out-of-band noise. The filter circuit is also subject to variation in response. Variation in the response of an amplifier is characterized by differences in phase of the amplifier output with respect to the phase of the input voltage. Response variation can also be characterized by an amplification factor (the ratio of the magnitude of the output with respect to the magnitude of the input voltage) which deviates from the nominal amplification factor of the amplifier. The variation in response can result from, among other things, ambient temperature changes on the amplifier, aging of the components and manufacturing tolerances in the electrical properties of the components.

Precisely determining the properties of the voltages induced in the receiver coils requires precise knowledge of the phase and amplitude response of the analog amplifiers. As is understood by those skilled in the art, the induction well logging instrument is typically subjected to large variations in ambient temperature as the instrument is inserted into and withdrawn from the wellbore, and as a result, the analog amplifiers typically undergo substantial variation in response. It is known in the art to provide a system for periodically measuring the variation in response of the analog amplifier while the instrument is disposed in the wellbore. Such a system is described, for example, in U.S. Pat. No. 4,439,831 issued to Sinclair. The system in the Sinclair '831 patent includes a switch which connects an attenuated test signal from the oscillator directly to the input of the analog amplifier circuit. Since the amplitude and phase of the oscillator test signal are known, the variation in response of the analog amplifier can be measured directly, and applied as "correction factors" to the circuits which determine the properties of the voltages induced in the receiver coils.

A drawback to the system disclosed in the Sinclair '831 patent is that when the switch operates to conduct the test signal to the input of the analog amplifier, the receiver coils are disconnected from the amplifier input and measurements of the receiver voltages are not made. The amount of time during which the test signal is conducted to the amplifier is therefore typically limited. Limited test signal time provides the possibility that short-term variations in the amplifier response will go undetected. More precise determination of short-term amplifier response variations could be made by increasing the amount of time the test signal is applied to the amplifier, but in so doing the receiver coils may be disconnected so long as to introduce inaccuracies in determination of the properties of the induced voltage. As is understood by those skilled in the art, properties of extremely small magnitude voltages are more accurately determined by integrating the measurement of receiver voltage over a period of time. Shortening the period of time, as results with using a system as disclosed in the Sinclair '831 patent for example, may reduce the accuracy of determining the properties of the voltages induced in the receiver coils.

Accordingly, it is an object of the present invention to provide a system for determining the variation in phase and amplitude response of the analog amplifiers which does not require switchably connecting the test signal into the amplifier input.

It is a further object of the present invention to provide a system of determining variation in phase and amplitude response of the analog amplifier which does not reduce the time during which the receiver coils are connected to the amplifier and voltage measurements integrated, but is also sensitive to short-term variations in amplifier response.

SUMMARY OF THE INVENTION

The present invention is a method of determining the amplitude and phase response of a receiver amplifier in an induction well logging instrument. The method includes generating an oscillating current at at least one frequency and energizing a transmitter coil disposed in the instrument with the oscillating current. A first test signal is generated having a known phase and amplitude relationship with respect to the oscillating current and a different frequency than any frequency in the oscillating current. Voltages induced in a receiver coil corresponding to electrical properties of an earth formation proximal to the instrument are amplified in the receiver amplifier and detected. A predetermined portion of the first test signal is conducted to the receiver amplifier, thereby causing the amplifier to generate a combined output including the first test signal and a signal resulting from voltages induced in the receiver coil by electromagnetic fields in the earth formation. The oscillating current is also combined with the first test signal to form a combined test/reference signal. The method includes spectrally analyzing the combined test/reference signal and analyzing the combined output of the receiver amplifier, and comparing spectral analysis of the combined test/reference to spectral analysis of the combined output to determine the phase and amplitude response of the receiver amplifier.

In a preferred embodiment, the method includes linear scaling of the response of the amplifier at the test signal frequency to derive the amplifier response at other frequencies in the voltages induced in the receiver coil corresponding to the electrical properties of the earth formation.

DESCRIPTION OF THE PREFERRED EMBODIMENT

Figure 1:
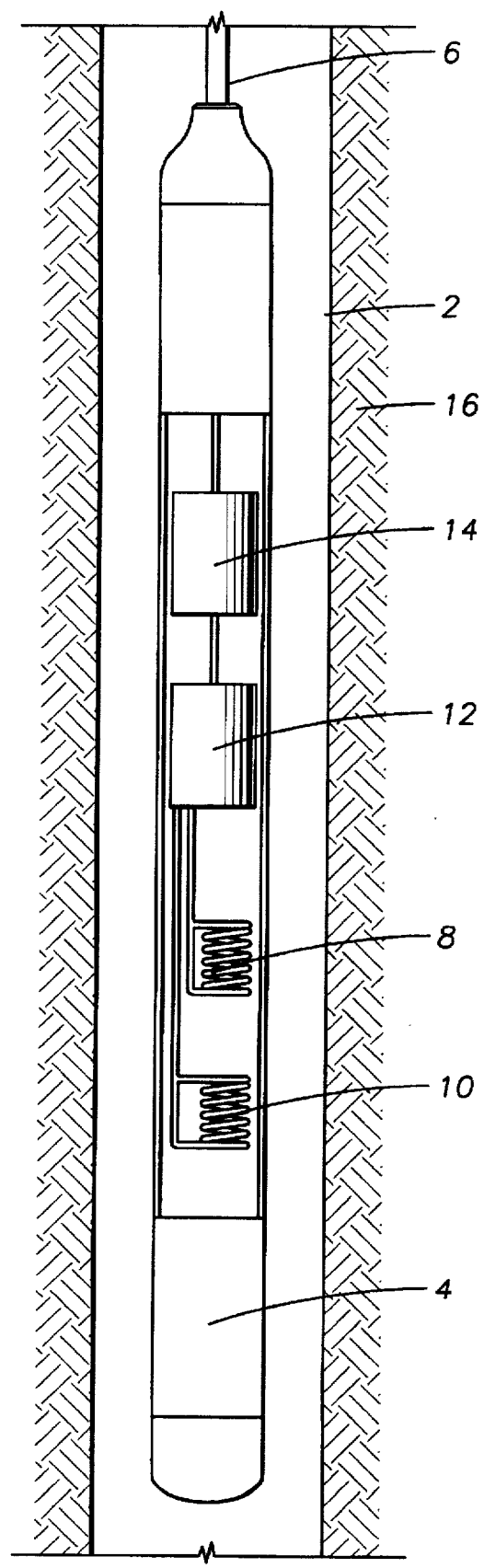
FIG. 1 shows an induction logging instrument inserted into a wellbore.

FIG. 1 shows an induction logging instrument 4, including the system of the present invention, as it would typically be used in a wellbore 2 penetrating an earth formation 16. The instrument 4 is generally lowered into the wellbore 2 at one end of an armored electrical cable 6. The cable 6 can include at least one insulated electrical conductor (not shown separately) for supplying electrical power to the instrument 4 and for communicating signals from the instrument 4 to the earth's surface for observation and recording.

The induction logging instrument 4 includes a transmitter coil 8 which, as is understood by those skilled in the art, can comprise a plurality of coils positioned at axially spaced apart locations along the instrument 4 in a predetermined arrangement adapted to focus induced electromagnetic fields into a desirable pattern within the earth formation 16. The instrument 4 can also include a receiver coil 10, which as understood by those skilled in the art can also comprise a plurality of coils positioned at axially spaced apart locations in a predetermined arrangement adapted to increase the sensitivity of the receiver coil 10 to electromagnetic fields at a radial distance and in an axial pattern which is desirable to the system operator.

The transmitter coil 8 and the receiver coil 10 are electrically connected to a signal generator/processor, shown generally at 12. The signal generator/processor 12 can include an oscillator (not shown separately in FIG. 1) which generates oscillating electrical current having a predetermined frequency and waveform for energizing the transmitter coil 8. The oscillating current passing through the transmitter coil 8 induces correspondingly oscillating magnetic fields and eddy currents within the earth formation 16, as is understood by those skilled in the art. The eddy currents themselves induce voltages in the receiver coil 10 which are measured and characterized by circuits (not shown separately in FIG. 1) in the signal generator/processor 12. As is understood by those skilled in the art, the amplitude and phase of the voltages induced in the receiver coil 10 relative to the amplitude and phase of the oscillating current energizing the transmitter coil 8, are indicative of the electrical conductivity of the earth formation. The signal generator/processor 12 includes the previously recited circuits (not shown separately in FIG. 1) for characterizing the voltages induced in the receiver coil 10, and other circuits (not shown separately in FIG. 1) for generating signals representing the amplitude and phase of the induced voltages. As is understood by those skilled in the art, the signals representing the amplitude and phase of the voltages induced in the receiver coil 10 can be in the form of analog voltages proportional to the magnitude of the phase and the amplitude. Alternatively, the signals can be in the form of digital words representing the magnitude of the phase and the amplitude sampled at spaced apart time intervals. The signals can be conducted to a telemetry unit 14 for transmission to the earth's surface for observation and recording.

Figure 2:
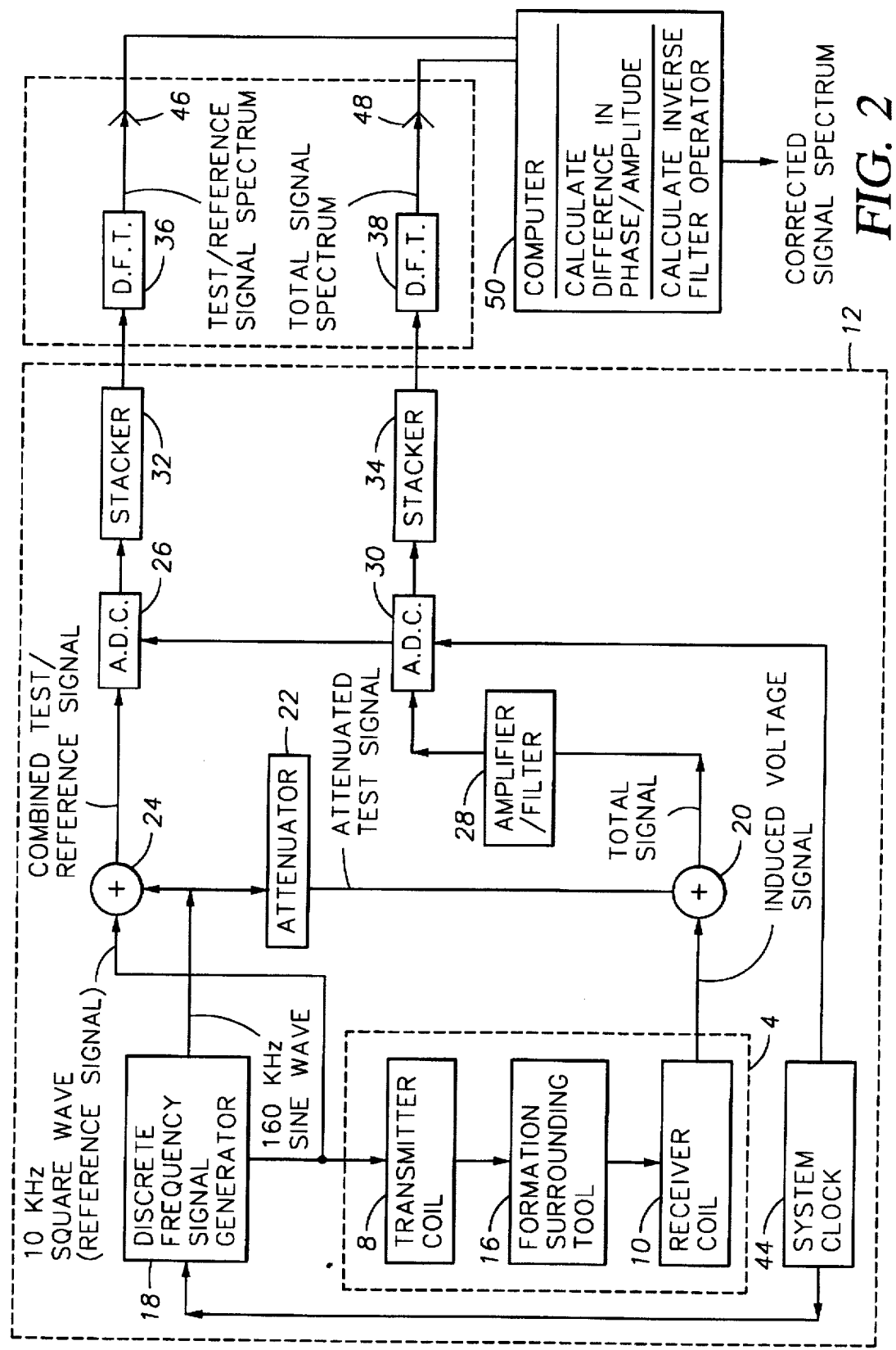
FIG. 2 shows a functional block diagram of the system of the present invention.

Referring now to FIG. 2, the system of the present invention will be explained in more detail. FIG. 2 shows the signal generator/processor unit 12 as a functional block diagram. The oscillating current which energizes the transmitter coil 8 preferably is generated by a type of oscillator known in the art as a discrete frequency signal generator 18. In the present embodiment of the invention, the output of the descrete frequency signal generator 18 can comprise a square wave having a fundamental frequency of about 10 kilohertz (kHz). As is understood by those skilled in the art, a square wave typically includes all the odd "harmonic" (integer multiple) frequencies of the fundamental frequency. In the present embodiment, odd harmonics up to the 15th harmonic (150 kHz) can be included in the square wave.

A particular embodiment of the signal generator 18 can include a random access memory ("RAM"—not shown separately for clarity of the illustration) and a digital to analog converter ("DAC"—not shown separately) connected to the RAM. The RAM can be programmed to contain digital words representing the magnitude of the oscillating current at spaced apart time intervals. The words are sequentially converted to analog voltages in the DAC, and the analog voltages are conducted through the transmitter coil 8, preferably through a power amplifier (not shown separately). It is to be understood that other embodiments such as combinations of analog signal generators of types well known in the art could equally perform the function of the discrete frequency signal generator 18. The embodiment of the signal generator 18 described herein is meant only to serve as an example and is not to be construed as a limitation on the invention.

The oscillating current, comprising the square wave output of the signal generator 18 as previously explained, is conducted to the transmitter coil 8. The oscillating current passing through the transmitter coil 8 induces correspondingly oscillating magnetic fields and eddy currents within the formation (shown as 16 in FIG. 1). The eddy currents themselves induce voltages in the receiver coil 10 related to the conductivity of the earth formation 16.

The discrete frequency signal generator 18 can also generate a test signal which is substantially synchronous with the square wave. The term substantially synchronous, as used to describe the relationship of the test signal to the square wave, indicates that one cycle of the test signal begins at substantially the same time as one cycle of the square wave, and that the test signal typically has a frequency which is an integer multiple of the fundamental frequency of the square wave. The test signal can be provided separately at another output terminal on the discrete frequency signal generator 18. In the present embodiment, the test signal can be a 160 kHz sine wave.

In addition to being conducted to the transmitter coil 8, the square wave output of the signal generator 18 can also be conducted to a first mixer 24. The first mixer 24 combines the square wave with the test signal to provide a combined test/reference signal. The combined test/reference signal is conducted to a first analog to digital converter (ADC) 26. The first ADC 26 generates digital samples of the combined test/reference signal at spaced apart time intervals, preferably at a rate at least 4 times the maximum frequency (160 kHz in the present embodiment) present in the combined test/reference signal, which in the present embodiment can be 640 kHz. Additional processing of the digital samples of the combined test/reference signal will be further explained.

The voltages induced in the receiver coil 10 by the eddy currents are conducted, through a second mixer 20, which will be further explained, to an analog amplifier 28. The analog amplifier 28 forms another part of the signal generator/processor 12. The analog amplifier 28 increases the magnitude of the induced voltages from the receiver coil 10 to magnitudes compatible with the input range of a second ADC 30. The previously described 160 kHz sine wave test signal, in addition to being conducted to the first mixer 24, is also conducted to an attenuator 22. The attenuator 22 reduces the magnitude of the test signal to a level, which when amplified in the analog amplifier 28, will be compatible with the input range of the second ADC 30. The output of the attenuator 22 is conducted to the second mixer 20 where it is combined with the output of the receiver coil 10. The signal input to the amplifier 28, therefore, includes the 160 kHz test signal, which has a known phase relationship with respect to the square wave oscillating current driving the transmitter coil 8, and includes induced voltages from the receiver coil 10, which have a magnitude and a phase at each odd-harmonic frequency in the square wave related to the electrical conductivity of the earth formation 16. The signal input to the amplifier 28 is referred to as the total signal.

After amplification by the analog amplifier 28, the total signal is digitized by the second ADC 30. The second ADC 30 also preferably generates digital samples at the rate of 640 kHz. The first ADC 26 and the second 30 ADC are both operated by clock pulses from a system clock 44. The system clock 44 operates at a rate which enables generating digital signal samples by the ADC's 26, 30 at the preferred rate of 640 kHz. The system clock 44 also provides timing signals to the signal generator 18 so that the 160 kHz test signal and the square wave oscillating current can be generated substantially synchronously with the generation of the digital signal samples by the ADC's 26, 30. Generation of digital signal samples synchronously with generation of the test signal and the square wave oscillating current enables a form of digital signal processing known as digital integration, or digital stacking. Digital stacking can be performed by a first stacker 32 coupled to the first ADC 32 and also by a second stacker 34 coupled to the second ADC 30. Digital stacking is performed to increase the signal-to-noise ratio. A system for digital stacking is described, for example, in U.S. patent application Ser. No. 08/331,802, assigned to the assignee of the present invention.

The output of the digital stackers 32, 24 can be conducted to the telemetry unit (shown as 14 in FIG. 1) directly, or optionally can be processed in a digital signal processor (DSP—not shown separately) comprising a first 36 and a second 38 discrete Fourier transform (DFT) function. If desired by the system designer, the DSP can be disposed within the instrument 4, preferably forming part of the signal generator/processor 12. An example of a digital signal processor which can perform the required fast 36 and second 38 DFT functions is a unit made by Texas Instruments, Inc. and sold under model designation TMS320C30.

The output of the first DFT 36 represents the phase and amplitude spectra of the combined test/square wave reference signal. Any variation in the phase or amplitude of the test/reference signal can be observed as a change in the spectra calculated by the first DFT 36. Similarly, the output of the second DFT 38 represents the amplitude and phase spectra of the total signal (which comprises the induced voltages from the receiver coil 10 and the 160 kHz sine wave test signal).

The output of the second DFT 38 is indicative of a combination of the effects of the earth formation 16 and any variations in response of the analog amplifier 28. The effects of the variation in the response of the amplifier 28 can be determined by comparing the phase and amplitude of the 160 kHz test signal component of the second DFT 38 output with the phase and amplitude of the 160 kHz test signal component also present in the output of the first DFT 36. The comparison can be performed in a computer 50 located at the earth's surface. Alternatively the computer 50 can be disposed inside the instrument (4 in FIG. 1).

Comparison of the outputs of the first DFT 36 and the second DFT 38 can determine the response of the amplifier 28 because the 160 kHz test signal component in the output of the first DFT 36 has been affected only by the first mixer 24, the first ADC 26 and the first stacker 32, all of which do not substantially affect the phase and amplitude of any signals imparted to them. The 160 kHz test signal component in the output of the second DFT 38, however, has passed through the attenuator 22, the second mixer 20 and the analog amplifier 28. Therefore, any difference in phase and amplitude of the 160 kHz test signal components observed in the two DFT outputs corresponds to the phase and amplitude response of the analog amplifier 28 at a frequency of 160 kHz, after any effects of the attenuator 22 have been accounted for.

The phase and amplitude response of the analog amplifier 28 at the other frequencies present in the total signal can be readily determined if the amplifier response with respect to frequency is known. One class of analog circuitry having known response with respect to frequency is Bessel filters. As is known in the art, Bessel filters have phase response which is linearly related to frequency. The phase response of the analog amplifier 28 including a Bessel filter can be determined at frequencies other than 160 kHz by linearly scaling the phase response of the amplifier 28 at 160 kHz to the desired frequency.

If the analog amplifier 28 has a more complex relationship of response with respect to frequency, then other sine wave test signals at additional frequencies can be imparted to the mixers 24, 20. For example, additional sine waves at frequencies of 20, 40 and 100 kHz could be included with the 160 kHz signal in order to determine the phase response of the analog amplifier 28 at frequencies of 20, 40, and 100 kHz as well as at 160 kHz. An interpolation operator can be generated by the computer 32 which can calculate the response of the analog amplifier 28 at all of these frequencies, and at the frequencies present in the total signal as a result of the square wave.

As is understood by those skilled in the art, the phase and amplitude response of the analog amplifier 28 can be used to calculate an inverse filter operator which can substantially cancel effects of the phase and amplitude response of the amplifier 28. The inverse filter operator can form part of the programming of the computer 50, as is understood by those skilled in the art.

The system disclosed herein can continuously determine the phase and amplitude response of the analog amplifier 28 without switching off the signal input from the receiver coil 10 to insert the test signal into the amplifier 28. Continuous determination of amplitude and phase response while the receiver coil enables more accuenables more accurate determination of electrical properties of the earth formation 16.

The example of the present invention described in the present embodiment is not meant to be an exclusive representation of the present invention. Those skilled in the art can readily devise other embodiments which will perform the functions ascribed to the invention. Accordingly, the present invention should be limited in scope only by the claims appended hereto.

What is claimed is:

1. A method of determining amplitude and phase response of a receiver amplifier in an induction well logging instrument comprising:

generating an oscillating current having at least one frequency;

energizing a transmitter coil disposed on said instrument with said oscillating current;

generating a first test signal having a known phase and amplitude relationship with respect to said oscillating current, said first test signal having a different frequency than any frequency present in said oscillating current;

amplifying and detecting, in said receiver amplifier, voltages induced in a receiver coil disposed on said instrument and coupled to said amplifier, said voltages corresponding to electrical properties of an earth formation proximal to said instrument;

conducting a predetermined portion of said first test signal to said receiver amplifier, thereby causing said amplifier to generate a combined output comprising said first test signal and a signal resulting from said induced voltages;

combining said oscillating current with said first test signal to form a combined test/reference signal;

spectrally analyzing said combined test/reference signal and said combined output; and comparing spectral analysis of said combined test/reference to spectral analysis of said combined output to determine response of said receiver amplifier at the frequency of said test signal.

2. The method as defined in claim 1 further comprising determining said response of said amplifier at said at least one frequency of said oscillating current by linearly scaling said response of said amplifier at said frequency of said test signal.

3. The method as defined in claim 1 wherein said step of spectrally analyzing comprises performing a discrete Fourier transform.

4. The method as defined in claim 1 wherein said first test signal comprises a sine wave having a frequency of about 160 kHz.

5. The method as defined in claim 1 wherein said oscillating current comprises a square wave.

6. The square wave as defined in claim 5 wherein said square wave comprises a fundamental frequency of about 10 kHz and comprises odd-harmonics of said fundamental frequency.

7. The method as defined in claim 6 further comprising:

generating additional test signals each having a frequency different from said frequency of said first test signal, said additional test signals each having a frequency different from any frequency contained in said oscillating current; and determining response of said amplifier at all frequencies contained in said oscillating current by interpolating said response of said amplifier at frequencies of each one of said test signals.

8. The method as defined in claim 1 wherein said step of detecting comprises digitizing and digital stacking.

9. The method as defined in claim 1 wherein said step of stacking comprises generating digital signal samples at a rate which is an integer multiple of a frequency of said oscillating signal and said first test signal, said digital signal samples generated so that one of said samples is substantially contemporaneous with initiation of one cycle of said first test signal and said oscillating current.

* * * * *